May 15, 1956 W. M. ZOOK 2,745,517
DASHPOT CYLINDER
Filed April 20, 1953
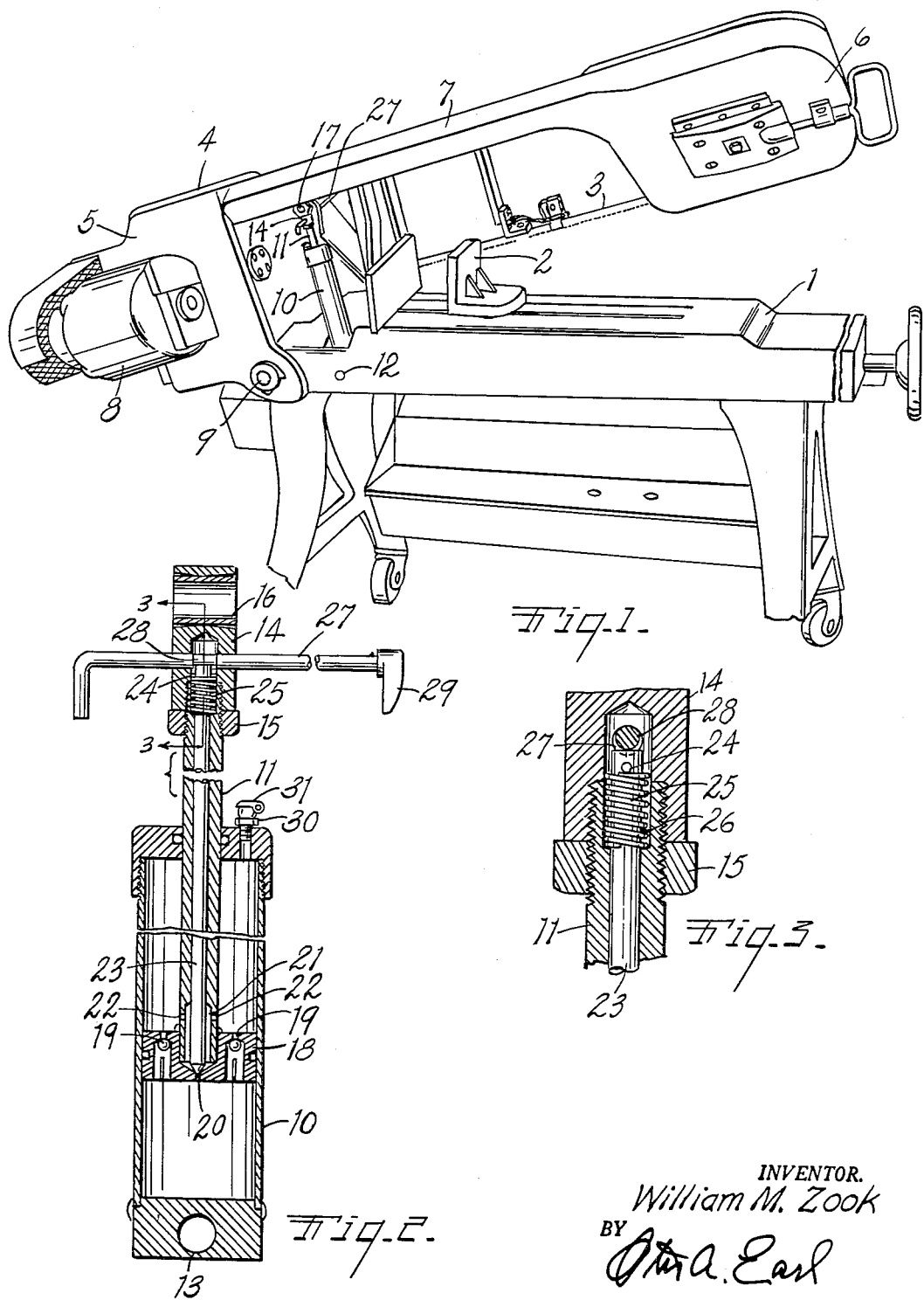
INVENTOR.
William M. Zook
BY
Otto A. Earl
ATTORNEY.

United States Patent Office 2,745,517
Patented May 15, 1956

2,745,517
DASHPOT CYLINDER

William M. Zook, Bangor, Mich., assignor to Kalamazoo Tank & Silo Company, Kalamazoo, Mich., a corporation of Michigan Application April 20, 1953, Serial No. 349,582

1 Claim. (Cl. 188—88)

This invention relates to improvements in dashpot cylinders.

The principal objects of this invention are:

First, to provide a novel form of dashpot cylinder and piston that will support the frame of a cutoff band saw on the bed of the saw and permit the saw frame to lower at even adjustable rates of speed.

Second, to provide a dashpot cylinder and piston with adjustable valve connections between the faces of the piston which permits adjustment of the rate of travel of the piston in the cylinder.

Third, to provide a dashpot cylinder and piston with an adjustable valved connection between the faces of the piston entirely enclosed within the piston and piston rod.

Fourth, to provide a supporting dashpot for the frame of a cutoff band saw which dashpot is compact, inexpensive, and easy to control.

Other objects and advantages of the invention will be apparent from a consideration of the following description and claims.

The drawings, of which there is one sheet, illustrate a highly practical form of the dashpot cylinder and valve structure and one method of mounting the same on a cutoff band saw.

Fig. 1 is a perspective view of a cutoff band saw with the dashpot incorporated therewith.

Fig. 2 is a longitudinal cross sectional view through the dashpot cylinder and piston and valve assembly.

Fig. 3 is a fragmentary enlarged cross sectional view taken along the plane of the line 3—3 in Fig. 2.

Fig. 1 illustrates a familiar type of cutoff band saw adapted for cutting metal and provided with a base 1. A vise 2 mounted on the base is adapted to hold the work in a position to be operated on by the saw blade 3. The band saw blade 3 is rotatably mounted on a saw frame generally indicated at 4 and including a driving head 5 and idler head 6 joined together by the beam 7. The driving head 5 supports a driving wheel or pulley, not illustrated, for the saw blade, and a motor 8 for operating the saw. The driving head 5 is pivotally supported on the base 1 by the pin 9 so that the frame and saw blade will descend across the work held in the vise 2.

In order to support the saw frame 4 in elevated position above the base while the work is installed in the vise and to control the rate of descent of the saw blade, there is provided a dashpot cylinder 10 and coacting piston rod 11. The lower end of the cylinder 10 is pivotally secured to the base 1 by a pin 12 which passes through a hole 13 in the lower end cap of the cylinder. The upper end of the piston rod 11 is provided with a fitting 14 that is threadedly connected to the piston rod and axially adjustable therealong. The fitting is locked in place by a lock nut 15. A bushing 16 in the upper end of the fitting receives the pivot pin or connecting bolt 17 that connects the piston rod to the under side of the beam 7.

Upward motion of the saw frame 4 draws the piston rod 11 out of the cylinder 10 and moves the piston 18 upwardly in the cylinder. Oil positioned above the piston is passed downwardly through a pair of downwardly opening ball check valves 19. So long as oil is retained in the lower end of the cylinder, the piston, piston rod, and saw frame will remain elevated. Oil is permitted to travel upwardly from the lower end of the cylinder to above the piston by passing through the port 20 in the center of the cylinder and a chamber 21 formed in the lower end of the piston rod 11. Ports 22 deliver the oil from the chamber 21 to the upper end of the cylinder. Passage of oil through the port 20 can be stopped or regulated by the needle valve formed on the bottom of the valve rod 23. The valve rod extends slidably through the piston rod which is tubular and is provided with an abutment pin 24 at its upper end. The pin 24 engages one end of a coil spring 25 positioned around the upper end of the valve rod and seated against the bottom of a recess 26 in the upper end of the tubular piston rod. The valve rod 23 is thus biased to open the port 20.

Extending transversely through the fitting 14 and across the end of the valve rod 23 is a valve control shaft 27. The shaft 27 has an eccentric cam portion 28 engageable with the upper end of the valve rod to overcome the bias spring 25. A handle 29 is secured to the end of the shaft and permits the operator of the saw to control the rate of descent of the saw frame. The shaft 27 extends transversely of the saw frame to the front and back sides thereof as illustrated in Fig. 1 so that the valve and the rate of descent of the saw frame can be controlled from either side of the machine.

An oil supply fitting 30 is mounted on the upper end of the cylinder and provided with an antisplash cover 31. All of the operating elements of the control valve are enclosed within the cylinder or the piston rod and are thus protected against dirt and injury. The eccentric 28 permits accurate and infinitely variable adjustment of the rate of descent of the saw frame while adjustment of the upper fitting 14 and lock nut 15 on the piston rod permits the eccentric 28 to be moved axially of the valve rod to properly locate the eccentric with respect to the valve rod. The entire dashpot and regulating valve assembly is easily mounted on the saw base and saw frame and there are no external connections or conduits on the dashpot which might become damaged during operation of the saw.

Having thus described my invention, what I claim as new and desire to secure by Letters Patent is:

A dashpot cylinder and coacting piston rod having their opposite ends adapted to be pivotally connected to separate members to support and regulate the movement of said members relative to each other, said assembly comprising a piston connected to said piston rod and reciprocable in said cylinder and having a check valve positioned therein and opening inwardly of the cylinder from said rod, said piston rod being tubular with a valve chamber formed in the end thereof connected to said piston, a valve port opening from the opposite face of said piston to the chamber in said piston rod and therethrough to the other end of said cylinder, a fitting axially adjustably mounted on the outer end of said piston rod and adapted to form the connection between said piston rod and said one of said members, a valve rod reciprocable in said piston rod and having a valve closing surface on its inner end coacting with the port in said piston, a spring biasing said valve rod to valve opening position, a valve control rod journalled in said fitting and extending transversely through said fitting and across the outer end of said valve rod, and a hand operating piece on the end of said control rod positioned exteriorly of said fitting, and an eccentric surface on said control rod coacting with the outer end of said valve rod.

References Cited in the file of this patent
UNITED STATES PATENTS

| 1,245,815 | Starrett | Nov. 6, 1917 |
| 1,616,540 | Morgan | Feb. 8, 1927 |
| 2,274,497 | Naegele et al. | Feb. 24, 1942 |
| 2,337,738 | Christensen | Dec. 28, 1943 |